United States Patent
Nishio

(10) Patent No.: US 6,896,299 B1
(45) Date of Patent: May 24, 2005

(54) RESIN PIPE JOINT

(75) Inventor: Kiyoshi Nishio, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 09/581,213
(22) PCT Filed: Nov. 5, 1998
(86) PCT No.: PCT/JP98/04993
§ 371 (c)(1), (2), (4) Date: Jun. 22, 2000
(87) PCT Pub. No.: WO00/28254
PCT Pub. Date: May 18, 2000

(51) Int. Cl.$^7$ ............................................. F16L 25/00
(52) U.S. Cl. ...................................... 285/331; 285/354
(58) Field of Search ................................ 285/331, 328, 285/354, 423; F16L 19/04

(56) References Cited

U.S. PATENT DOCUMENTS

| | | | |
|---|---|---|---|
| 5,154,453 A | * 10/1992 | Nishio | 285/342 |
| 5,370,424 A | * 12/1994 | Wendorff | 285/332.4 |
| 5,388,871 A | * 2/1995 | Saitoh | 285/247 |
| 5,553,900 A | * 9/1996 | Fukumoto et al. | 285/331 |
| 5,951,060 A | * 9/1999 | Fukano et al. | 285/423 |
| 5,996,636 A | * 12/1999 | Fukano et al. | 285/354 |
| 6,089,621 A | * 7/2000 | Nishio | 285/331 |
| 6,193,239 B1 | * 2/2001 | Fukano et al. | 285/354 |

FOREIGN PATENT DOCUMENTS

| | | | |
|---|---|---|---|
| EP | 0 380 970 A2 | * | 8/1990 |
| JP | 2-117494 | | 9/1990 |
| JP | 4-248095 | * | 9/1992 |
| JP | 5-87287 | * | 4/1993 |
| JP | 5-322091 | * | 12/1993 |
| JP | 10-54489 | * | 2/1998 |

OTHER PUBLICATIONS

Japanese Patent Appl. Laying open No. H03–168495.

\* cited by examiner

*Primary Examiner*—Eric K. Nicholson
*Assistant Examiner*—Aaron Dunwoody
(74) *Attorney, Agent, or Firm*—Bacon & Thomas

(57) ABSTRACT

A cylindrical projecting portion is disposed in a projected tip end portion of an inner ring which is to be pressingly inserted into one end portion of a pipe member to be integrated therewith, an inner radial face of the cylindrical projecting portion is formed as a conical tapered face in which the diameter is larger as one moves toward the outer side in the axial direction, and a cylindrical groove into which the cylindrical projecting portion of the inner ring including the conical tapered face is to be fitted in the axial direction to form a sealing portion is formed in an inner area of a receiving port of a joint body to form sealing portions between the two members and, whereby even a small fastening force due to screw advancement of a pressing ring is enabled to generate a high contact pressure between the tapered face and an outer radial face, and faces and which are opposed thereto, to ensure a sealing performance of very high reliability.

4 Claims, 8 Drawing Sheets

RESIN PIPE JOINT

TECHNICAL FIELD

The present invention relates to a pipe joint made of resin, and particularly to a pipe joint made of resin which is used for the connection of piping for a liquid having high purity or ultrapure water to be handled in a production process of various technical fields such as the production of semiconductor devices, the production of medical equipment and medicine, food processing, and the chemical industry.

BACKGROUND ART

Conventionally, as pipe joints made of resin of this kind, those having configurations shown in FIG. 7 to FIG. 9 are known. Among them, the pipe joint made of resin shown in FIG. 7 comprises: a cylindrical joint body 34 in which a receiving port 30 is formed in one end portion in the axial direction, a primary sealing portion 31 intersecting the axis C is formed in an inner area of the receiving port 30, a secondary sealing portion 32 intersecting the axis C is formed in an entrance area of the receiving port 30, and an external thread portion 33 is formed on the outer periphery of the receiving port 30; a sleeve-like inner ring 40 in which a fitting portion 35 having an outer diameter that allows the portion to be fitted into the receiving port 30 of the joint body 34 is formed in an inner end portion in the axial direction, a bulge portion 36 having a mountain-like section shape is formed in an outer end side in the axial direction, the diameter of a resin pipe member 37 is increased when the fitting portion 35 is pressingly inserted into one end portion of the pipe member 37 under a state where the fitting portion 35 is outwardly projected in the axial direction, an inner end sealing portion 38 that abuts against the primary sealing portion 31 of the joint body 34 is formed in an end portion of the fitting portion 35, and a sealing face 39 that abuts against the secondary sealing portion 32 of the receiving port 30 is formed in a place corresponding to the bulge portion 36; and a pressing ring 42 having an internal thread portion 41 which is to be screwed to the external thread portion 33 of the joint body 34. Under a state where an insertion portion 43 of the pipe member 37 into which the inner ring 40 is pressingly inserted to be integrated therewith is inserted into the receiving port 30 of the joint body 34, the internal thread portion 41 of the pressing ring 42 is screwed to the external thread portion 33 of the joint body 34 to screwingly advance the pressing ring 42 toward the joint body 34, whereby the inner ring 40 is pressed in the axial direction to cause the secondary sealing portion 32 and the sealing face 39 of the inner ring 40 to respectively abut against the primary sealing portion 31 and the secondary sealing portion 32 of the receiving port 30 of the joint body 34, so as to exert a sealing force.

The pipe joint made of resin shown in FIG. 8 is configured in the following manner. A tapered sealing portion 46 in which the diameter is gradually reduced toward the inner side in the axial direction is formed in an entrance area of a receiving port 45 of the joint body 44 into which a one-end insertion portion 37a of a resin pipe member 37 is to be inserted. An outer ring 48 in which a sealing portion 47 that is to abut against the sealing portion 46 is formed in an inner end is fitted onto the insertion portion 37a of the pipe member 37, whereby a bulge portion 49 which is locally projected toward the radially inner side is formed on the pipe member 37. A pressing ring 52 having an internal thread portion 51 which is to be screwed to an external thread portion 50 formed in the outer periphery of the joint body 44 is screwingly advanced toward the joint body 44, whereby the outer ring 48 is pressed in the axial direction to cause the sealing portions 46 and 47 to abut against each other in the axial direction, so as to exert a sealing force.

The pipe joint made of resin shown in FIG. 9 is configured in the following manner. A tapered sealing portion 55 in which the diameter is gradually reduced toward the inner side in the axial direction is formed in an entrance area of a receiving port 54 of a joint body 53 into which a one-end insertion portion 37a of a resin pipe member 37 is to be inserted. An inner ring 57 which has a peripheral wall 56 having a trapezoidal section shape is pressingly inserted into the inner side of the one-end insertion portion 37a of the pipe member 37, whereby a bulge portion 58 which is locally projected toward the radially outer side along the peripheral wall 56 of the inner ring 57 is formed on the pipe member 37. A pressing ring 60 having an internal thread portion 59 which is to be screwed to an external thread portion 61 formed in the outer periphery of the joint body 53 is screwingly advanced toward the joint body 53, whereby the bulge portion 58 of the pipe member 37 and the inner ring 57 are pressed toward the joint body 53 to cause an inclined face 58a on the pipe end side of the bulge portion 58 to be pressed against the tapered sealing portion 55 in the axial direction, so as to exert a sealing force.

All the pipe joints made of resin of the conventional art which have been described above are configured so that the pressing ring 42, 52, or 60 is screwingly advanced to perform fastening, so that the sealing portion is caused to abut in the axial direction to apply a compression force, whereby a seal surface pressure is generated to exert a sealing function. Therefore, the pipe joints have a problem in that the sealing function is impaired for a short time period by reduction of the seal surface pressure due to a temporal creep or stress relaxation of the pressing ring 42, 52, or 60, the resin pipe member 37, or the like, and hence fluid leak easily occurs. Furthermore, the pipe joints have a low resistance to an external force, and, in order to ensure a predetermined sealing function, the fastening force of the pressing ring 42, 52, or 60 must be controlled very strictly during a connection work by means of the dimension in the axial direction or the fastening torque. Therefore, a connection work requires high skill and experience.

SUMMARY OF THE INVENTION

The present invention has been conducted in view of the above-mentioned background of the art. It is an object of the present invention to provide a pipe joint made of resin which, although not requiring skill and experience pipe connection, can generate a high contact pressure so that an excellent sealing performance can be ensured for a long term in spite of a temporal creep or stress relaxation.

The pipe joint made of resin of the present invention is a pipe joint made of resin characterized in that the pipe joint comprises: a sleeve-like inner ring which is to be pressingly inserted into one end portion of a pipe member to be integrated with the pipe member under a state where the inner ring is outward protruded in an axial direction from one end portion of the pipe member; a joint body in which a cylindrical receiving port is formed in one end portion, an insertion portion of the pipe member into which the inner ring is pressingly inserted being to be inserted into the receiving port; and a pressing ring which is to be screwed to the one end portion of the joint body, presses the inner ring from an outer side of the pipe member by means of screw advancement toward the one end portion of the joint body, to cause a projected tip end portion of the inner ring to abut against an inner area of the receiving port of the joint body, thereby forming a sealing portion, an inner radial face of the projected tip end portion of the inner ring is formed as a conical tapered face in which a diameter is larger as further moving toward an outer side in the axial direction, a cylindrical groove is formed in an inner area of the receiving port of the joint body, the projected tip end portion of the inner ring including the conical tapered face is to be fitted into the axial direction into the groove, and the groove cooperates with at least one of a place of the conical tapered face and a place on a side of an outer radial face of the projected tip end portion, to form the sealing portion.

According to the invention having this configuration, when the pressing ring is screwingly advanced toward the join body, the projected tip end portion of the inner ring is fitted in the axial direction into the cylindrical groove formed in the inner area of the receiving port of the joint body, and the sealing portion is formed by at least one of a place on the side of an inner radial face and a place on the side of an outer radial face of the projected tip end portion, and the inner area of the receiving port of the joint body. The inner radial face of the projected tip end portion of the inner ring is formed as a conical tapered face in which the diameter is larger as further moving toward the outer side in the axial direction. At this time, as the fastening force is made stronger by the wedge effect due to the fastening of the pressing ring, therefore, a higher contact pressure is generated between the conical tapered face and the outer radial face of the projected tip end portion of the inner ring, and corresponding faces of the cylindrical groove of the joint body, whereby a very high sealing performance can be exerted. Between the conical tapered face of the projected tip end portion of the inner ring and the corresponding face which is opposed to the conical tapered face, particularly, it is possible to generate a very high contact pressure without excessively increasing the fastening force exerted by the pressing ring. Even when a temporal creep or stress relaxation occurs in the pressing ring or the resin pipe joint, therefore, it is possible to attain an effect that the original sealing performance can be ensured for a long term.

In the thus configured pipe joint made of resin, when one or plural projections which are projected in a radially outward direction and abut against an inner peripheral face of the joint body to form the sealing portion are disposed on the outer radial face of the projected tip end portion of the inner ring, the plural projections being separated from one another by a gap in the axial direction, particularly, a high contact pressure is concentrically generated in the projections, so that a higher sealing performance can be exerted.

When the outer radial face of the projected tip end portion of the inner ring, or the outer radial face of the projected tip end portion of the inner ring where the projections are disposed is formed as a conical tapered face in which a diameter is smaller as further moving toward an outer side in the axial direction, moreover, the wedge effect is enhanced, so that even a relatively small fastening force can produce a higher contact pressure of the sealing portion, whereby the sealing performance for a long term can be further improved.

When a cylindrical portion which abuts against an inner peripheral face of a cylindrical portion on an inner radial side of the cylindrical groove of the joint body is formed integrally with an inner radial side of the projected tip end portion of the inner ring, the cylindrical portion on the inner radial side of the cylindrical groove of the joint body can be reinforced, and an outer radial sealing portion can be formed in addition to the above-mentioned sealing portion, so that the sealing performance can be further improved.

DETAILED DESCRIPTION OF THE PREFERRED EMBODIMENTS OF THE INVENTION

Figure 1:
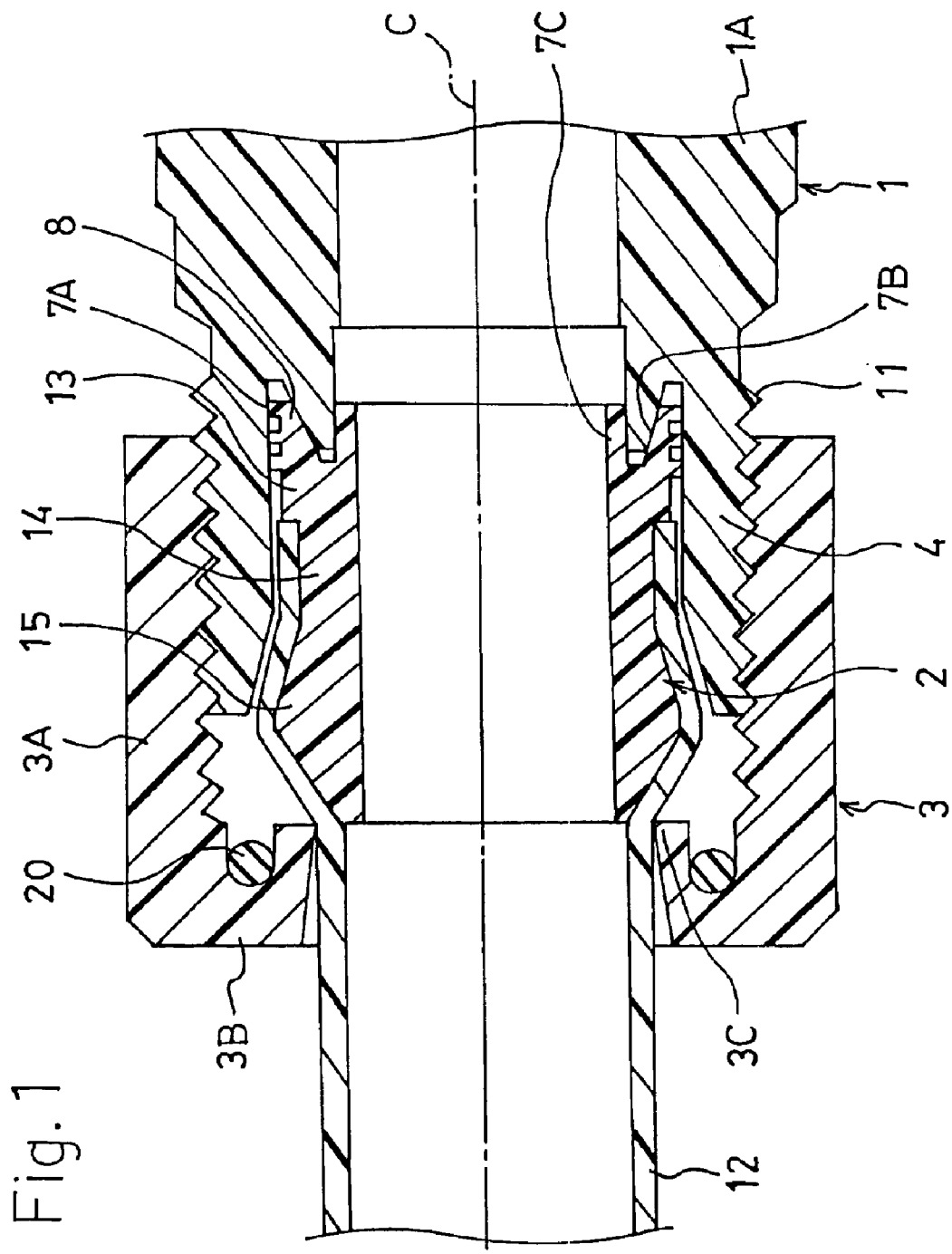
FIG. 1 is a longitudinal side section view showing a pipe joint made of resin of Embodiment 1 of the invention.
Figure 2:
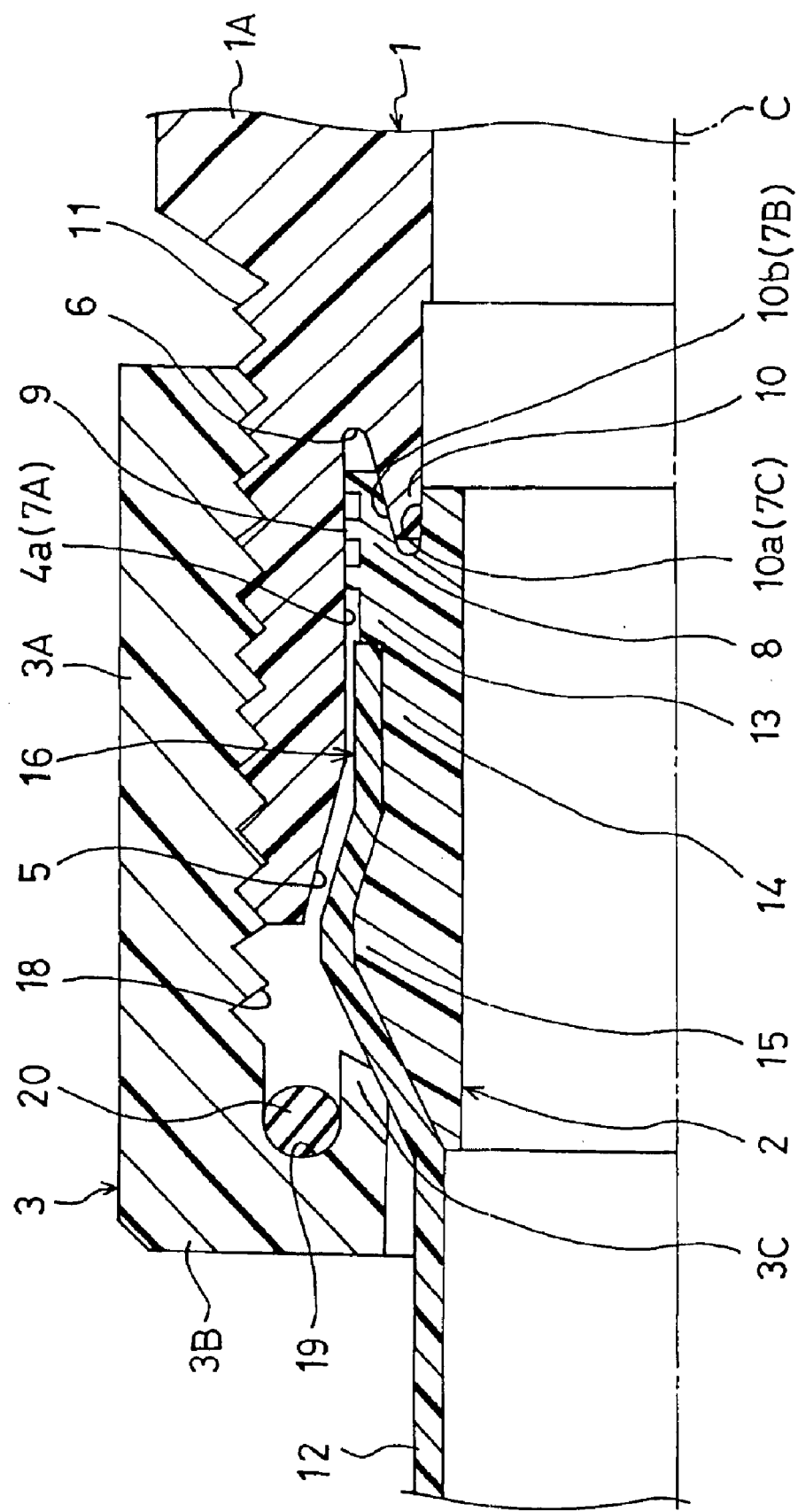
FIG. 2 is an enlarged half section view of main portions of FIG. 1.

Embodiment 1 will be described. A pipe joint made of resin shown in FIG. 1 and FIG. 2 is generally configured by the cylindrical joint body 1, a sleeve-like inner ring 2, and a cap nut-like pressing ring 3. These components are made of resin having excellent chemical resistance and heat resistance, such as PFA, PTFE, ETFE, CTFE, or ECTFE. The cylindrical joint body 1 is formed integrally with a pipe joint alone or a fluid apparatus.

In the joint body 1, a cylindrical receiving port 4 is formed at least in one end portion in the axial direction, an inclined face 5 intersecting the axis C is formed in an entrance area of the receiving port 4, a cylindrical groove 6 which forms a primary sealing portion 7A and a secondary sealing portion 7B that will be described later is formed in an inner area of the receiving port 4, and an external thread portion 11 is formed on the outer periphery of the receiving port 4.

Figure 3:
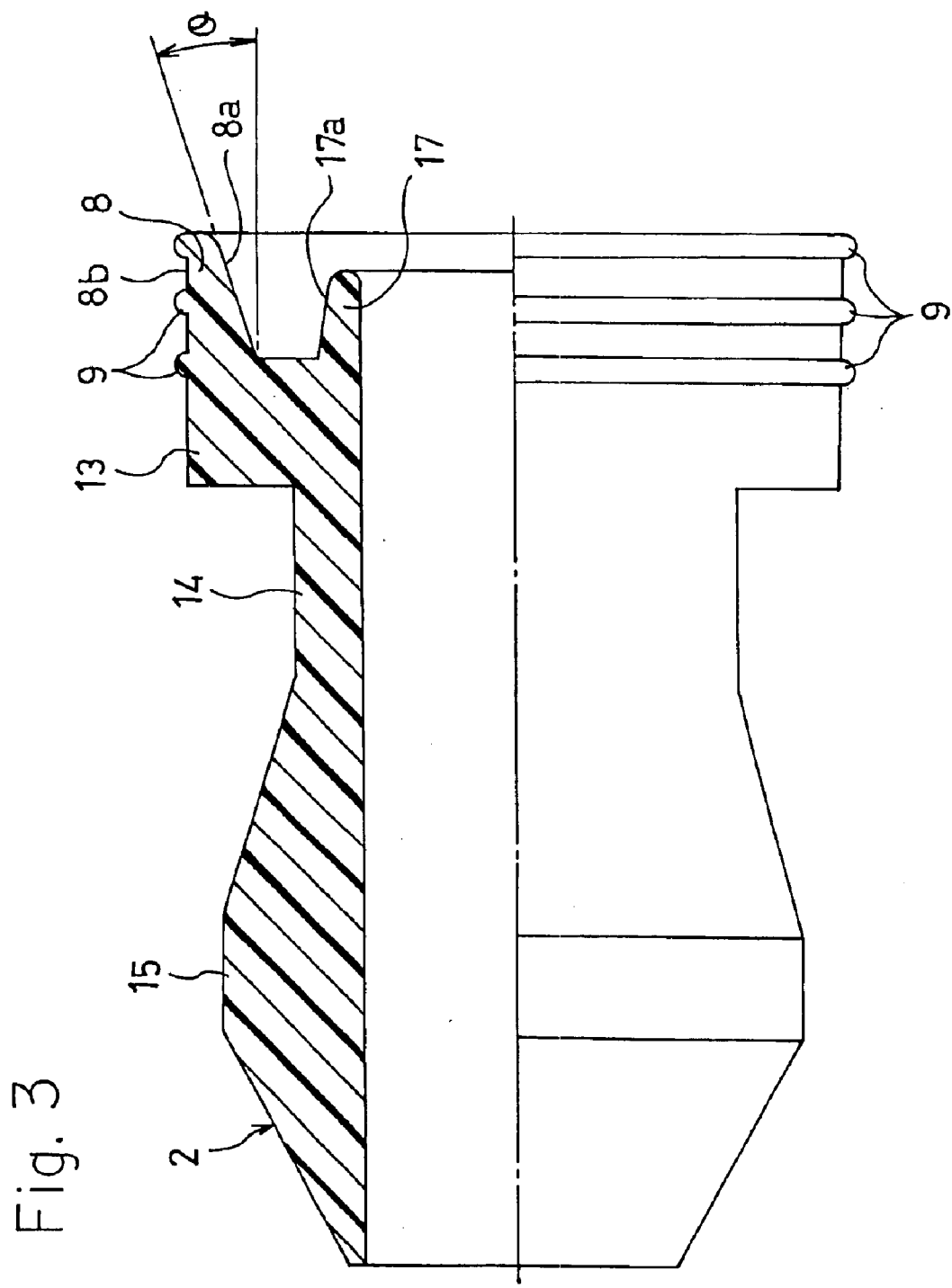
FIG. 3 is a half section view of main portions and illustrating the detail of the main configuration of FIG. 1.

As clearly shown in FIG. 3, in the sleeve-like inner ring 2, an inner diameter is smaller than the inner diameters of the resin pipe member 12 and a cylinder portion 1A of the joint body 1, and a cylindrical fitting portion 13 having an outer diameter which allows the portion to be fitted into the receiving port 4 of the joint body 1 is formed in the inner end portion. A bulge portion 15 having a mountain-like section shape is formed on the outer periphery on the basal end side of a pipe member press insertion portion 14 which is formed continuously with the cylindrical fitting portion 13. An insertion portion 16 of the pipe member 12 is formed which is to be inserted into the receiving port 4 of the joint body 1 with being integrated with the pipe member 12 by pressingly inserting the press insertion portion 14 into one end portion of the pipe member 12 under a state where the cylindrical fitting portion 13 is projected from the one end portion of the pipe member 12, to increase the diameter of the peripheral wall of the pipe member 12 in a place corresponding to the bulge portion 15.

A cylindrical projecting portion 8 which, when the insertion portion 16 is inserted into the receiving port 4 of the joint body 1, is fitted into the cylindrical groove 6 in the axial direction is formed in the tip end side of the cylindrical fitting portion 13 which is outwardly projected in the axial direction from the end portion of the pipe member 12 of the inner ring 2. An inner radial face of the cylindrical projecting portion 8 is formed as a conical tapered face 8a in which the diameter is larger as further moving toward the outer side in the axial direction. The inclination angle θ of the conical tapered face 8a with respect to the axis C is set to 1 to 60°, preferably, 5 to 20°.

A plurality of ring-like projections 9 which are projected in a radially outward direction and abut against an inner peripheral face 4a of the receiving port 4 of the joint body 1 to form the primary sealing portion 7A are disposed on an outer radial face 8b of the cylindrical projecting portion 8 of the inner ring 2 with being separated from one another by a gap in the axial direction (in the drawings, three projections are shown, or alternatively two, or four or more projections may be disposed, or only one projection in the axial direction may be disposed).

On the other hand, in the same manner as the conical tapered face 8a, an outer peripheral face 10b of an inner radial side cylindrical portion 10 of the cylindrical groove 6 of the joint body 1 into which the cylindrical projecting portion 8 of the inner ring 2 is to be fitted in the axial direction is formed as a conical reverse tapered face which has an inclination angle θ of 1 to 60°, preferably, 5 to 20° with respect to the axis C. The secondary sealing portion 7B is formed by abutting the tapered faces 8a and 10b against each other.

A cylindrical portion 17 which abuts against an inner peripheral face 10a of the inner radial side cylindrical portion 10 of the cylindrical groove 6 of the joint body 1 is formed integrally with the inner radial side of the cylindrical projecting portion 8 of the inner ring 2. A tertiary sealing portion 7C may be formed by the abutment of an outer peripheral face 17a of the cylindrical portion 17 and the inner peripheral face 10a of the inner radial side cylindrical portion 10 of the cylindrical groove 6.

In the cap nut-like pressing ring 3, an internal thread portion 18 which is to be screwed to the external thread portion 11 of the joint body 1 is formed in the inner peripheral face of a cylindrical portion 3A, an annular pressing piece 3B which elongates toward the axial center is continuously integrated with the outer end of the cylindrical portion 3A, and a pressing portion 3C is formed on the inner end on the inner periphery side of the annular pressing piece 3B.

An annular groove 19 is formed in the annular pressing piece 3B of the pressing ring 3, and an elastic ring 20 is fittingly held into the annular groove 19.

In the resin pipe joint comprising the components 1, 2, and 3, the press insertion portion 14 of the inner ring 2 is first pressingly inserted into one end portion of the pipe member 12 under a state where the cylindrical fitting portion 13 and the cylindrical projecting portion 8 are projected from the one end portion of the pipe member 12, to increase the diameter of the peripheral wall of the pipe member 12 in the place corresponding to the bulge portion 15 which is formed in the press insertion portion 14, whereby the two members 2 and 12 are integrally coupled with each other to form the insertion portion 16 of the pipe member 12.

Next, the insertion portion 16 of the pipe member 12 is inserted into the receiving port 4 of the joint body 1, and the internal thread portion 18 of the pressing ring 3 which is previously loosely fitted onto the pipe member 12 is then screwed to the external thread portion 11 of the joint body 1 to screwingly advance the pressing ring 3 toward the joint body 1, whereby the cylindrical projecting portion 8 on the side of the inner ring 2 is fitted in the axial direction into the cylindrical groove 6 on the side of the joint body 1.

Under this state, the pressing ring 3 is further screwingly advanced to exert a stronger fastening operation. As a result, an wedge effect appears between the conical tapered face 8a on the side of the cylindrical projecting portion 8 of the inner ring 2, and the conical reverse tapered face 10b of the cylindrical groove 6 on the side of the receiving port 4 of the joint body 1, and a high contact pressure is generated between the tapered faces 8a and 10b. At the same time, a high contact pressure is concentrically generated also in the place where the ring projections 9 disposed on the outer radial face 8b of the cylindrical projecting portion 9 abut against the inner peripheral face 4a of the receiving port 4 of the joint body 1.

In this way, it is possible to generate a high contact pressure in each of the primary sealing portion 7A and the secondary sealing portion 7B without excessively increasing the fastening force exerted by screw advancement of the pressing ring 3, so that, even when a temporal creep or stress relaxation occurs in the pressing ring 3 or the resin pipe joint 12, a very high sealing performance can be ensured for a long term.

As in Embodiment 1 described in above, the cylindrical portion 17 having the outer peripheral face 17a which abuts against the inner peripheral face 10a of the inner radial side cylindrical portion 10 of the cylindrical groove 6 of the joint body 1 is formed integrally with the inner radial side of the cylindrical projecting portion 8 of the inner ring 2, whereby the inner radial side cylindrical portion 10 of the cylindrical groove 6 of the joint body 1 can be supported from the inner side so as to be reinforced, and also the tertiary sealing portion 7C can be formed in addition to the above-mentioned double sealing portions so as to further improve the sealing performance.

In Embodiment 1, the configuration in which the ring-like projections 9 are disposed on the outer radial face 8b of the cylindrical projecting portion 8 of the inner ring 2 has been described. Alternatively, the ring-like projections may not be disposed, and a flat outer radial face 8b may directly abut against the inner peripheral face 4a of the receiving port 4 of the joint body 1 to form the primary sealing portion 7A.

Figure 4:
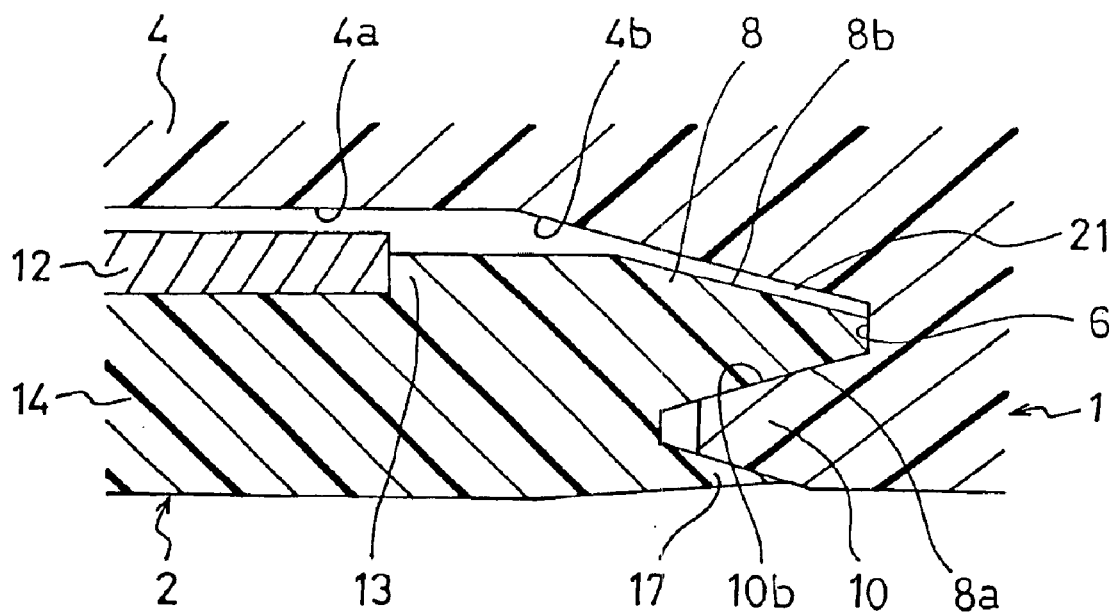
FIG. 4 is an enlarged half section view of main portions of a pipe joint made of resin of Embodiment 2 of the invention.

FIG. 4 shows Embodiment 2 of the invention. Embodiment 2 is configured so that the outer radial face 8b of the cylindrical projecting portion 8 of the inner ring 2 is formed as a conical tapered face which is inclined in a manner opposite to the conical tapered face 8a on the inner radial side, a tapered face 4b of the same inclination angle is formed also in the tip end of the inner peripheral face 4a on the side of the receiving port 4 of the joint body 1 which is opposed to the conical radial face 8b on the outer radial side, and, in the connection completion state, the tapered faces 8b and 4b do not abut against each other and a minute gap 21 is formed between the faces 8b and 4b.

In the pipe joint of Embodiment 2, in the same manner as Embodiment 1, double sealing which generates a high contact pressure and is configured by the secondary sealing portion 7B and the tertiary sealing portion 7C is configured, so that a sufficiently high sealing performance can be ensured.

Figure 5:
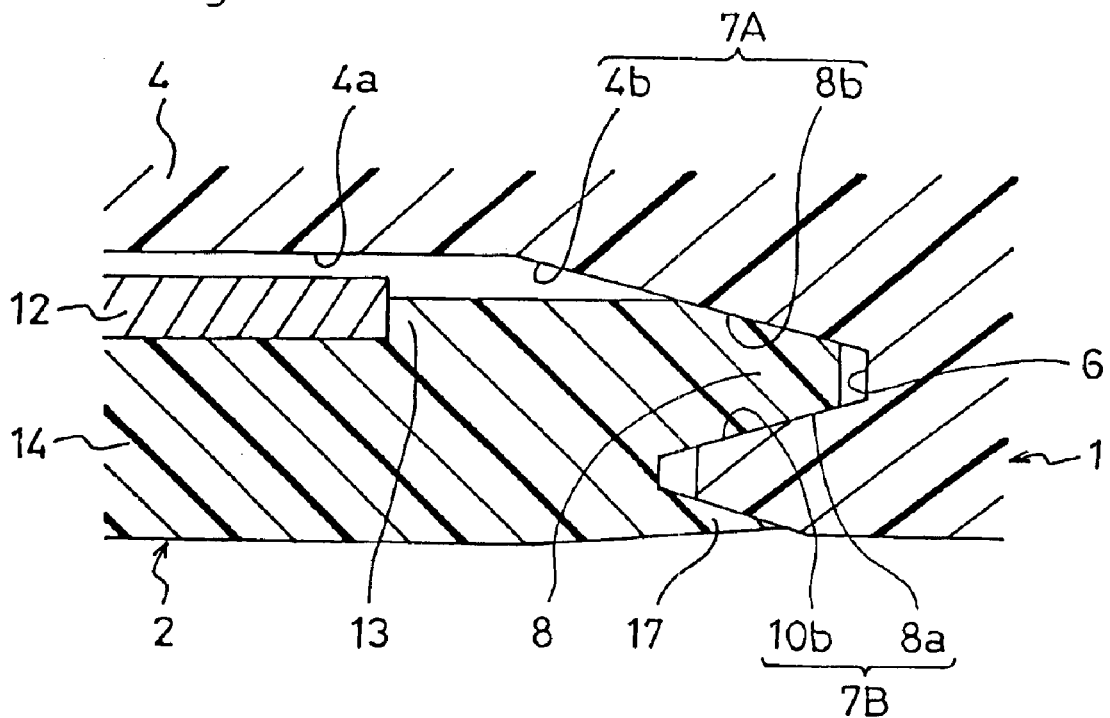
FIG. 5 is an enlarged half section view of main portions of a pipe joint made of resin of Embodiment 3 of the invention.

FIG. 5 shows Embodiment 3 of the invention. The pipe joint of Embodiment 3 is configured so that, in the same manner as Embodiment 2, the outer radial face 8b of the cylindrical projecting portion 8 of the inner ring 2 is formed as a conical tapered face which is inclined in a manner opposite to the conical tapered face 8a on the inner radial side, a tapered face 4b of the same inclination angle is formed also in the tip end of the inner peripheral face 4a on the side of the receiving port 4 of the joint body 1 which is opposed to the conical tapered face 8b on the outer radial side, and, in the connection completion state, the tapered faces 8b and 4b abut against each other to form the primary sealing portion 7A.

Figure 6:
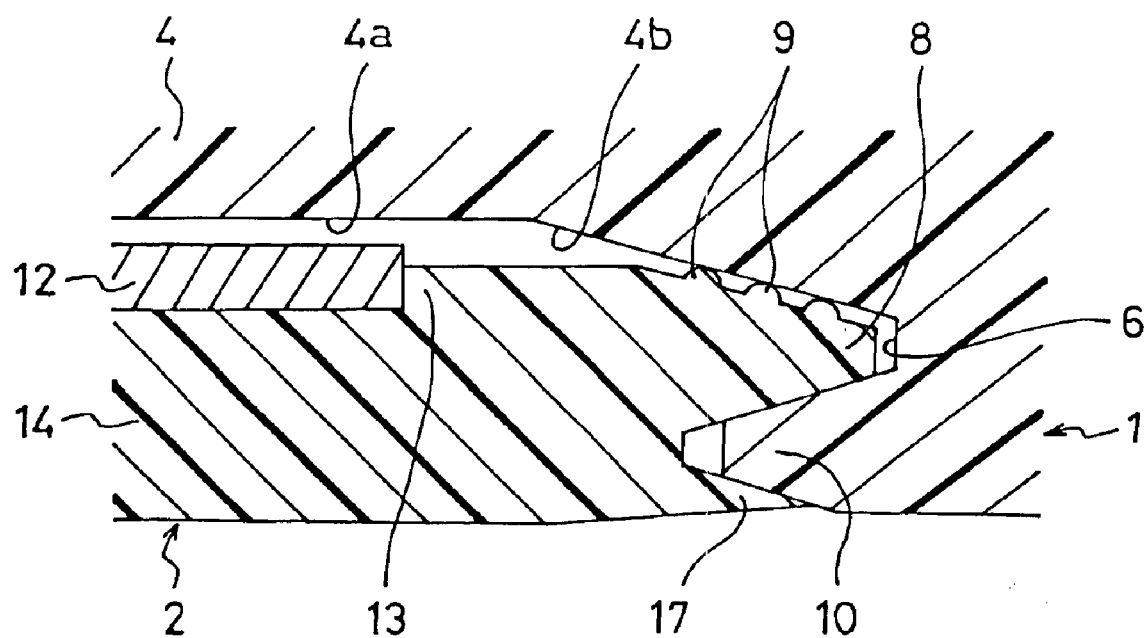
FIG. 6 is an enlarged half section view of main portions of a pipe joint made of resin of Embodiment 4 of the invention.
Figure 7:
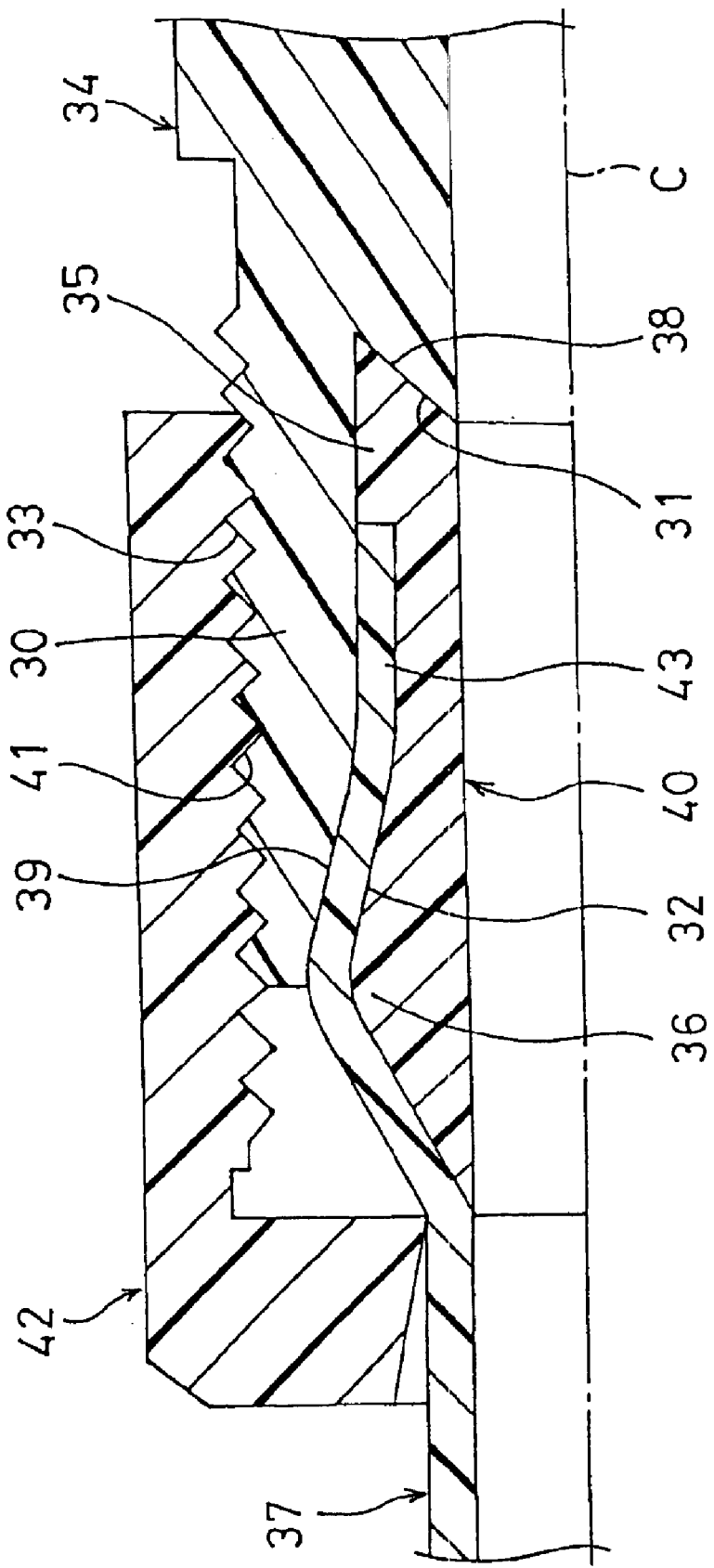
FIG. 7 is an enlarged half section view of main portions showing an example of a pipe joint made of resin of the conventional art.
Figure 8:
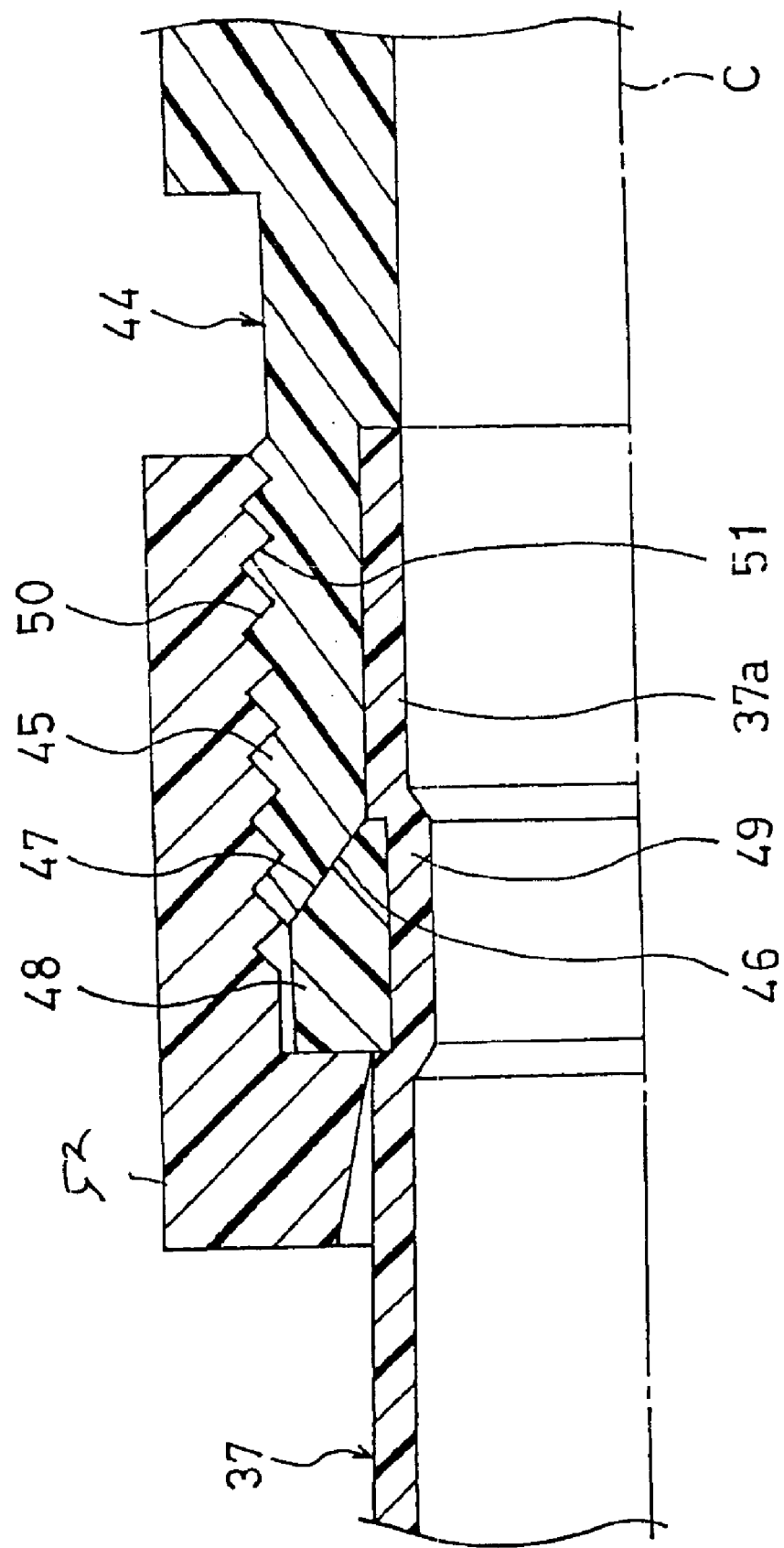
FIG. 8 is an enlarged half section view of main portions showing another example of a pipe joint made of resin of the convention art.
Figure 9:
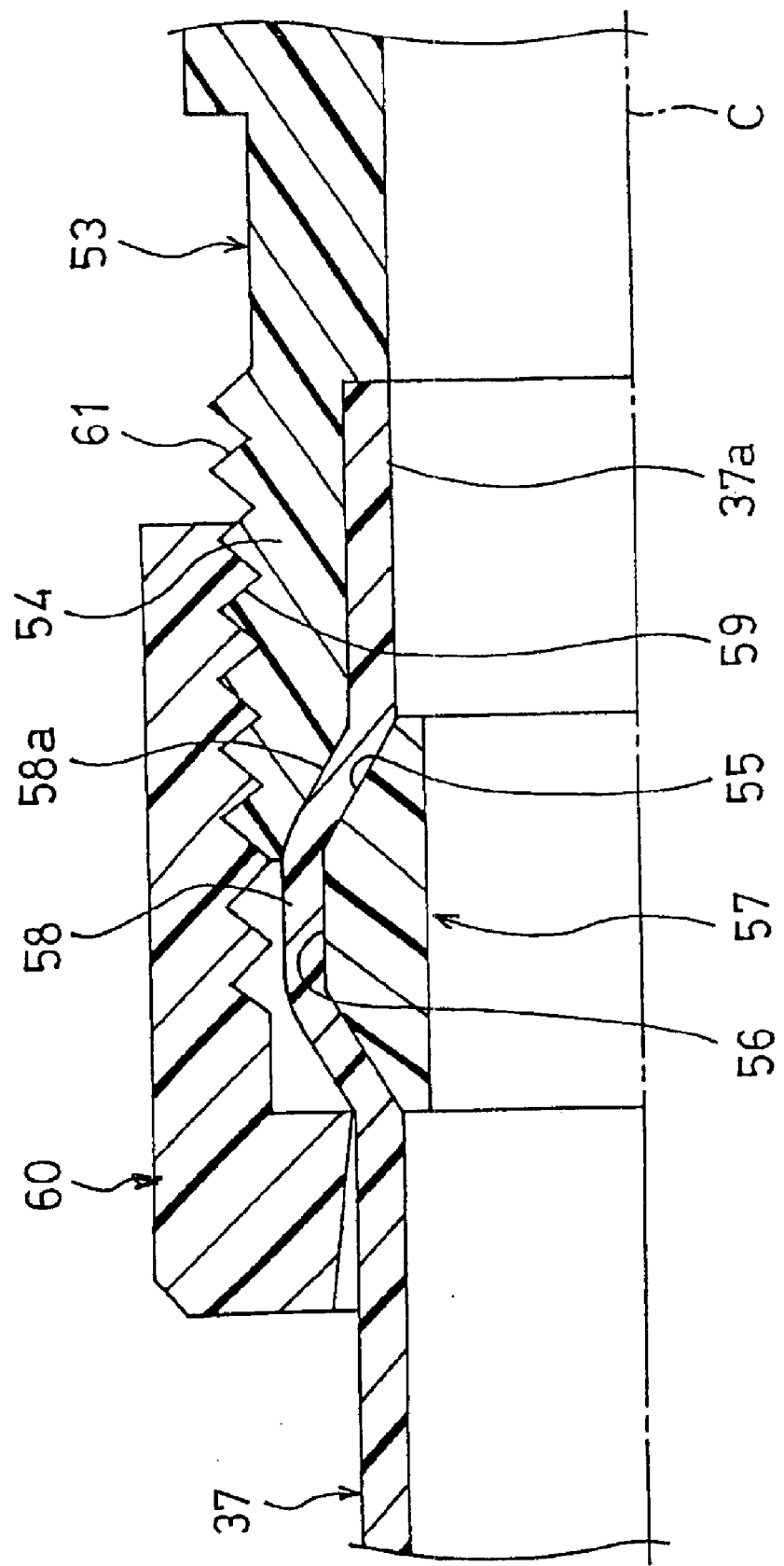
FIG. 9 is an enlarged half section view of main portions showing a further example of a pipe joint made of resin of the convention art.

FIG. 6 shows Embodiment 4 of the invention. The pipe joint of Embodiment 4 is configured so that, in the same manner as Embodiment 3, the tip ends of the outer radial face of the cylindrical projecting portion 8 of the inner ring 2 and the inner peripheral face 4a on the side of the receiving port 4 of the joint body 1 are formed as tapered faces 8b and 4b of the same inclination angle, one or plural ring-like projections 9 are disposed on the outer radial conical tapered face 8b on the side of the inner ring 2, and, in the connection completion state, the primary sealing portion 7A, the secondary sealing portion 7B, and the tertiary sealing portion 7C are formed between the pipe member 12 and the joint body 1.

In the pipe joints of Embodiments 3 and 4, the wedge effect is enhanced so that even a relatively small fastening force can make higher the contact pressures of the double sealing portions and a sealing performance for a long term can be further improved.

INDUSTRIAL APPLICABILITY

As described above, the pipe joint made of resin according to the invention provides a technique that an inner radial face of a projected tip end portion of an inner ring which is to be pressingly inserted into a pipe member to be integrated therewith is formed as a conical tapered face in which the diameter is larger as further moving toward the outer side in the axial direction, and a cylindrical groove into which the projected tip end portion of the inner ring including the conical tapered face is to be fitted in the axial direction to form a sealing portion is formed in an inner area of the receiving port of the joint body, whereby even a small fastening force exerted by a pressure ring is enabled to generate a high contact pressure on the tapered face and an outer radial face to ensure a sealing performance of high reliability.

What is claimed is:

1. A pipe joint made of resin, comprising:
    a sleeve inner ring which is to be pressingly inserted into one end portion of a pipe member to be integrated with said pipe member under a state where a projected tip end portion of said sleeve inner ring protrudes outwardly in an axial direction from one end portion of said pipe member, said tip end portion of said sleeve inner ring being engaged by said pipe member;
    a joint body in which a cylindrical receiving port is formed in one end portion, an insertion portion of said pipe member into which said sleeve inner ring is pressingly inserted, being inserted into said receiving port; and
    a pressing ring which is to be screwed to said one end portion of said joint body, presses an outer side of said pipe member by means of screw advancement toward said one end portion of said joint body, to cause said projected tip end portion of said sleeve inner ring to abut against an inner area of said receiving port of said joint body, and said pipe member to abut against a surface of said sleeve inner ring, thereby forming sealing portions, wherein:
    said sleeve inner ring defines an outer, axially extending surface and said receiving port defines an inner, axially extending surface, both said outer, axially extending surface and said inner, axially extending surface define a gap between them for at least part of the axially extending length of said axially extending surfaces, such that only said outer, axially extending surface engages a corresponding surface of the pipe member to thereby reduce the width of the gap and said inner, axially extending surface does not engage the pipe member,
    an inner radial face of said projected tip end portion of said outer, axially extending surface of said sleeve inner ring is formed as a conical tapered face in which a diameter is larger when further moving toward an outer side in the axial direction of said sleeve inner ring,
    a cylindrical groove is formed in an inner area of said receiving port of said joint body, said projected tip end portion of said sleeve inner ring including said conical tapered face being fitted in the axial direction in said cylindrical groove, and said cylindrical groove cooperates with said conical tapered face to form a secondary sealing portion, and with a place on a side of an outer radial face of said projected tip end portion to form a primary sealing portion,
    the inclination angle of said conical tapered face of said projected tip end portion of said sleeve inner ring with respect to the axis is set to 5 to 20°, and
    a cylindrical portion which abuts against an inner peripheral face of a cylindrical portion on an inner radial side of said cylindrical groove of said joint body is formed integrally with an inner radial side of said projected tip end portion of said sleeve inner ring, an outer peripheral face of said cylindrical portion abutting against said inner peripheral face of said cylindrical portion on said inner radial side to form a tertiary sealing portion.

2. A pipe joint made of resin according to claim 1, wherein one or plural projections which are projected in a radially outward direction and abut against an inner peripheral face of said receiving port of said joint body to form said sealing portion are disposed on said outer radial face of said projected tip end portion of said sleeve inner ring.

3. A pipe joint made of resin according to claim 1, wherein said outer radial face of said projected tip end portion of said sleeve inner ring is formed as a conical tapered face in which a diameter is smaller as further moving toward an outer side in the axial direction.

4. A pipe joint made of resin according to claim 2, wherein said outer radial face of said projected tip end portion of said sleeve inner ring on which said projections are formed is formed as a conical tapered face in which a diameter is smaller as further moving toward on outer side in the axial direction.

* * * * *